United States Patent
Yamauchi et al.

(10) Patent No.: US 9,229,173 B2
(45) Date of Patent: Jan. 5, 2016

(54) OPTICAL FIBER CONNECTOR COMPONENT AND OPTICAL FIBER CONNECTOR PROVIDED WITH OPTICAL FIBER CONNECTOR COMPONENT

(75) Inventors: Isao Yamauchi, Kawaguchi (JP); Yasuhiro Hyakutake, Kawaguchi (JP); Satoshi Kano, Kasukabe (JP)

(73) Assignee: ADAMANT KOGYO CO., LTD., Tokyo (JP)

( * ) Notice: Subject to any disclaimer, the term of this patent is extended or adjusted under 35 U.S.C. 154(b) by 349 days.

(21) Appl. No.: 13/880,090

(22) PCT Filed: Oct. 26, 2011

(86) PCT No.: PCT/JP2011/005980
§ 371 (c)(1), (2), (4) Date: Apr. 18, 2013

(87) PCT Pub. No.: WO2012/056691
PCT Pub. Date: May 3, 2012

(65) Prior Publication Data
US 2013/0216191 A1    Aug. 22, 2013

(30) Foreign Application Priority Data
Oct. 29, 2010  (JP) .................. 2010-244142

(51) Int. Cl.
*G02B 6/38*  (2006.01)
*G02B 6/36*  (2006.01)
*G02B 6/44*  (2006.01)

(52) U.S. Cl.
CPC ............ *G02B 6/3624* (2013.01); *G02B 6/3821* (2013.01); *G02B 6/3869* (2013.01); *G02B 6/3849* (2013.01); *G02B 6/3871* (2013.01); *G02B 6/4466* (2013.01)

(58) Field of Classification Search
None
See application file for complete search history.

(56) References Cited

U.S. PATENT DOCUMENTS

| 5,396,572 A | 3/1995 | Bradley et al. |
| 7,988,367 B2 | 8/2011 | Gurreri et al. |

(Continued)

FOREIGN PATENT DOCUMENTS

| CN | 101504476 A | 8/2009 |
| CN | 101515051 A | 8/2009 |

(Continued)

OTHER PUBLICATIONS

Apr. 30, 2013 International Preliminary Report on Patentability issued in International Patent Application No. PCT/JP2011/005980.

(Continued)

*Primary Examiner* — Tina Wong
(74) *Attorney, Agent, or Firm* — Oliff PLC (57) ABSTRACT

Provided are an optical fiber connector component which holds an optical fiber and is capable of being inserted through a thin pipe and capable of being inserted smoothly through a pipe, and an optical fiber connector provided with the optical fiber connector component. The optical fiber connector component comprises a ferrule having a fiber hole to hold an inserted coaxially disposed optical fiber, a stop ring arranged on the base end side of the ferrule, and an urging means arranged in between the ferrule and the stop ring; the optical fiber connector is characterized by having a housing and cover member coaxially connected to the optical fiber, and the cover member being fixed to the stop ring of the optical fiber component by means of a fixing member.

7 Claims, 7 Drawing Sheets

(56) References Cited

U.S. PATENT DOCUMENTS

| | | | |
|---|---|---|---|
| 7,997,806 B2 | 8/2011 | Nakagawa | |
| 8,425,125 B2 | 4/2013 | Gurreri et al. | |
| 2005/0232552 A1 | 10/2005 | Takahashi et al. | |
| 2006/0098922 A1* | 5/2006 | Yang | 385/88 |
| 2010/0284653 A1* | 11/2010 | Tamekuni et al. | 385/60 |

FOREIGN PATENT DOCUMENTS

| | | |
|---|---|---|
| JP | A-2003-337258 | 11/2003 |
| JP | A-2005-301151 | 10/2005 |
| WO | WO 2008/036994 A1 | 4/2008 |

OTHER PUBLICATIONS

Nov. 22, 2011 International Search Report issued in International Patent Application No. PCT/JP2011/005980; with English-language translation.

Sep. 3, 2014 Search Report issued in Chinese Patent Application No. 201180052083.3.

Oct. 10, 2014 Office Action issued in Chinese Patent Application No. 201180052083.3.

* cited by examiner

OPTICAL FIBER CONNECTOR COMPONENT AND OPTICAL FIBER CONNECTOR PROVIDED WITH OPTICAL FIBER CONNECTOR COMPONENT

TECHNICAL FIELD

The present invention relates to an optical fiber connector component and an optical fiber connector provided with the optical fiber connector component.

BACKGROUND ART

An optical communication technique in which an electric signal is converted into an optical signal to transmit information is characterized by enabling to raise communication speed more and transmit larger-capacity data than an electric communication. Recently, such characteristics of the optical communication technique attract attention, and a newly constructed building is designed in advance so that an optical fiber can be laid at the time of construction in many cases while an existing building is also provided with an optical fiber in many cases.

As a method for distributing an optical fiber, various wiring methods such as under-carpet wiring, exposed wiring, and concealed wiring are conventionally known. Recently, the concealed wiring is carried out in many cases from a viewpoint of enabling preservation of appearance even with distribution of the optical fiber. The concealed wiring is a wiring method for providing a pipe under a floor, in a ceiling, in a sidewall of a building, and the like in advance at the time of construction of the building and inserting the optical fiber into the provided pipe. In a case where the optical fiber is laid in an existing building, a pipe cannot be buried in a wall and the like, and thus a pipe is provided in an inconspicuous position of the building in advance before the optical fiber is distributed, and the optical fiber is inserted into this pipe.

Conventionally, a method of inserting the optical fiber provided at a tip end with an optical fiber connector into the pipe has been general. However, the optical fiber connector has a complicated structure provided with various members such as a latch to be used when the connector is connected to an adapter and when connection to the adapter is cancelled and easily gets stuck when the optical fiber is inserted into the pipe, which may cause disconnection of the optical fiber or breakage of the optical fiber connector. Also, when the disconnection of the optical fiber or the breakage of the optical fiber connector occurs, the optical fiber that has been inserted into the pipe has to be pulled, a new optical fiber has to be connected, or the optical fiber connector has to be replaced, and thereafter the optical fiber has to be inserted into the pipe again, which brings about poor operating efficiencies.

Also, the pipe is provided in a bent or curved state in some cases depending on a structure of the building and ways to arrange or lay the pipe. Especially in a case where the pipe is provided in this manner, the optical fiber connector easily gets stuck, which easily causes the aforementioned disconnection of the optical fiber or breakage of the optical fiber connector.

Various methods for solving such problems have been considered conventionally. For example, in an optical connector described in Patent Literature 1, a cap formed in a shape that does not cause the cap to easily get stuck in a pipe is attached to the optical connector to insert an optical fiber into the pipe, and the optical connector is adapted to enable the optical fiber to be inserted into the pipe smoothly and enable to reduce disconnection of the optical fiber or breakage of the optical connector.

Also, conventionally known is an optical fiber in which a surface of a covering material is subjected to a special process so as to reduce resistance between the optical fiber and an inner circumferential surface of a pipe to facilitate insertion into the pipe. This optical fiber is adapted to attach and fix an optical connector to the optical fiber after the optical fiber is inserted into the pipe.

Further, conventionally known as a method for inserting an optical fiber into a pipe is a method for inserting an optical fiber into a pipe while supplying gas such as compressed air in the pipe in an equal direction to a direction in which the optical fiber is inserted. By this method as well, the optical fiber can be inserted into the pipe easily, which can reduce disconnection of the optical fiber or breakage of an optical connector.

CITATION LIST

Patent Literature

Patent Literature 1: WO 2008/036994 A

SUMMARY OF INVENTION

Technical Problem

Recently, while space in which the pipe can be provided tends to decrease along with more efficient use of interior space of a building, there is an increasing need for laying of the optical fiber. Accordingly, a thinner pipe is desired to be buried in a wall and the like of a newly constructed building. Also, there is recently an increasing need for constructing a building in a short period, and the optical fiber is desired to be inserted into the pipe efficiently to improve operating efficiencies. To do so, whether or not the optical fiber can be laid more efficiently with use of the thinner pipe is an important point.

However, in the conventional optical fiber inserted into the pipe by attaching the optical fiber connector in advance, a pipe having an inner diameter at least enabling the optical fiber connector to be inserted must be provided in a building, which causes a problem of difficulty in thinning of the pipe. Especially in a case of the optical connector described in Patent Literature 1, since the cap is attached to the optical connector, the optical connector part is further enlarged, and a pipe having a larger inner diameter enabling the cap part to pass therethrough must be provided.

Also, in the method of inserting the optical fiber subjected to the special process on the covering material directly into the pipe, the assembling operation of the optical fiber connector must be performed after insertion of the optical fiber into the pipe. This leads to prolonged assembling operating time at a laying location, which causes a problem of poor operating efficiencies.

Further, even the conventional method for inserting the optical fiber into the pipe while supplying gas such as compressed air in the pipe in an equal direction to a direction in which the optical fiber is inserted cannot solve the problem in which the optical fiber connector gets stuck, the problem of the disconnection of the optical fiber or the breakage of the optical fiber connector caused by getting stuck of the optical fiber connector, and the problem of the decrease in operating efficiencies caused by the requirement of another insertion of the optical fiber in a case where the optical fiber is inserted into a pipe provided in a bent or curved state.

The present invention is accomplished by taking such problems into consideration thereof, and an object thereof is to provide an optical fiber connector component enabling to be inserted into a thinner pipe more smoothly and efficiently and an optical fiber connector including this optical fiber connector component and enabling to improve operating efficiencies in assembly drastically.

Solution to Problem

An optical fiber connector component according to a first invention is summarized by (1) an optical fiber connector component comprising:
a ferrule having a fiber hole letting an optical fiber inserted thereinto and holding the optical fiber and a flange portion;
a stop ring disposed on a base end side of the ferrule; and
a biasing means pressing the ferrule disposed between the flange portion of the ferrule and the stop ring, (2) the optical fiber connector component according to claim 1, wherein the ferrule, the stop ring, and the biasing means are arranged to align axes thereof, (3) the optical fiber connector component according to claim 1, wherein the ferrule includes a ferrule main body and a ferrule holding member provided coaxially with the ferrule main body and holding the ferrule main body, and the ferrule main body has the fiber hole at an axial center thereof,
wherein the ferrule holding member has a holding portion letting the optical fiber inserted and holding the optical fiber, the flange portion is formed to have a larger diameter than the holding portion, and an end portion on a base end side of the ferrule main body is attached to the flange portion, and
wherein the biasing means and the stop ring have diameters equal to or smaller than an outer diameter of the flange portion, (4) the optical fiber connector component according to claim 1, further comprising a cap formed in a tapered shape in which an outer diameter is gradually thinned toward a tip end, wherein the cap can be attached to a tip end of the ferrule, (5) the optical fiber connector component according to claim 1, further comprising a boot having a hole letting the optical fiber inserted thereinto at a center portion in a longitudinal direction and attached to a base end side of the stop ring, (6) the optical fiber connector component according to claim 1, wherein the stop ring has a flange or brim protruded and formed outward in a radial direction of a fiber inserting hole, and (7) the optical fiber connector component according to claim 6, wherein the flange of the stop ring is provided on a base end side with a wind receiving portion against which flowing gas hits, and the end portion on the base end side of the ferrule main body is provided with a funnel-shaped recess guiding an end portion of an optical fiber core wire to the fiber hole of the ferrule main body.

Also, an optical fiber connector according to a second invention is summarized by (8) an optical fiber connector comprising:
A housing;
A cover member coupled and fixed with the housing; and
the optical fiber connector component according to claim 1 arranged and fixed in an inside of a coupled body of the housing and the cover member, (9) the optical fiber connector according to claim 8, wherein the cover member is provided with a fixing member inserting hole,
wherein the stop ring has the flange and a recess portion,
wherein a fixing member has a cut-out portion and provided on both sides of the cut-out portion with a pair of leg portions, the pair of leg portions of the fixing member inserted in the fixing member inserting hole of the cover member is fitted in the recess portion of the stop ring, and a front surface of the fixing member abuts on the flange by the biasing means, and
wherein the cover member and the optical fiber connector component are coupled and fixed, (10) the optical fiber connector according to claim 9, wherein outer diameters of the ferrule, the biasing means, and the stop ring of the optical fiber connector component are formed to be smaller than inner diameters of through holes of the housing and the cover member, and (11) the optical fiber connector according to claim 8, wherein the cover member and the stop ring of the optical fiber connector component are coupled and fixed by the fixing member.

Advantageous Effects of Invention

In the optical fiber connector component according to the present invention, since the ferrule, the stop ring, and the biasing means constituting the optical fiber connector component are formed to be smaller than outer dimensions of the housing and the cover member, and the optical fiber is inserted into a pipe by attaching the ferrule, the stop ring, and the biasing means to the optical fiber, the optical fiber connector component can be inserted into a thin pipe efficiently.

Also, in the optical fiber connector component according to the present invention, since the biasing means and the stop ring are formed to be equal to or smaller than the outer diameter of the flange portion formed in the ferrule holding member, getting stuck of the optical fiber connector component in the pipe can be reduced further when the optical fiber is inserted into the pipe, which enables the optical fiber to be inserted more efficiently.

Further, in the optical fiber connector component according to the present invention, since the cap formed in a tapered shape in which the outer diameter is gradually thinned toward the tip end is attached, getting stuck of the optical fiber connector component in the pipe can be reduced still further when the optical fiber is inserted into the pipe, which enables the optical fiber to be inserted still more efficiently.

In addition, since the optical fiber connector component according to the present invention includes the boot on the base end side of the stop ring, getting stuck of the optical fiber connector component in the pipe on a base end side of the optical fiber connector component can be reduced further. Accordingly, the optical fiber connector component according to the present invention enables the optical fiber to be inserted more efficiently.

Also, in the optical fiber connector component according to the present invention, the flange is formed in the stop ring, which facilitates reception of force by gas supplied in the pipe and enables the optical fiber to be inserted efficiently.

Also, in the optical fiber connector according to the present invention, since the housing and the cover member are coupled and fixed, the optical fiber connector component is arranged and fixed in the inside of the coupled body of the housing and the cover member, and the cover member and the stop ring are coupled and fixed by the fixing member, the cover member and the housing can be attached to the optical fiber connector component after the optical fiber connector component is inserted into the pipe and is pulled out of an opposed end portion. Accordingly, in the optical fiber connector according to the present invention, the optical fiber can be laid easily with use of a thin pipe, and efficient laying of the optical fiber can be achieved.

BRIEF DESCRIPTION OF DRAWINGS

FIG. 6 (a) to 6(h) are explanatory view illustrating a process of attaching the optical fiber connector component to an optical fiber.

FIG. 7 (a) to 7(e) are explanatory views illustrating a process of assembling the optical fiber connector.

DESCRIPTION OF EMBODIMENTS

A configuration of an optical fiber connector component according to the present invention will be described based on FIGS. 1 and 2. In the present specification, "a tip end," "a base end," "an up," "a down," "a left," and "a right" in relation to an optical fiber are referred to as directions illustrated in FIG. 1.

(Configuration of Optical Fiber Connector Component 1)

Figure 1:
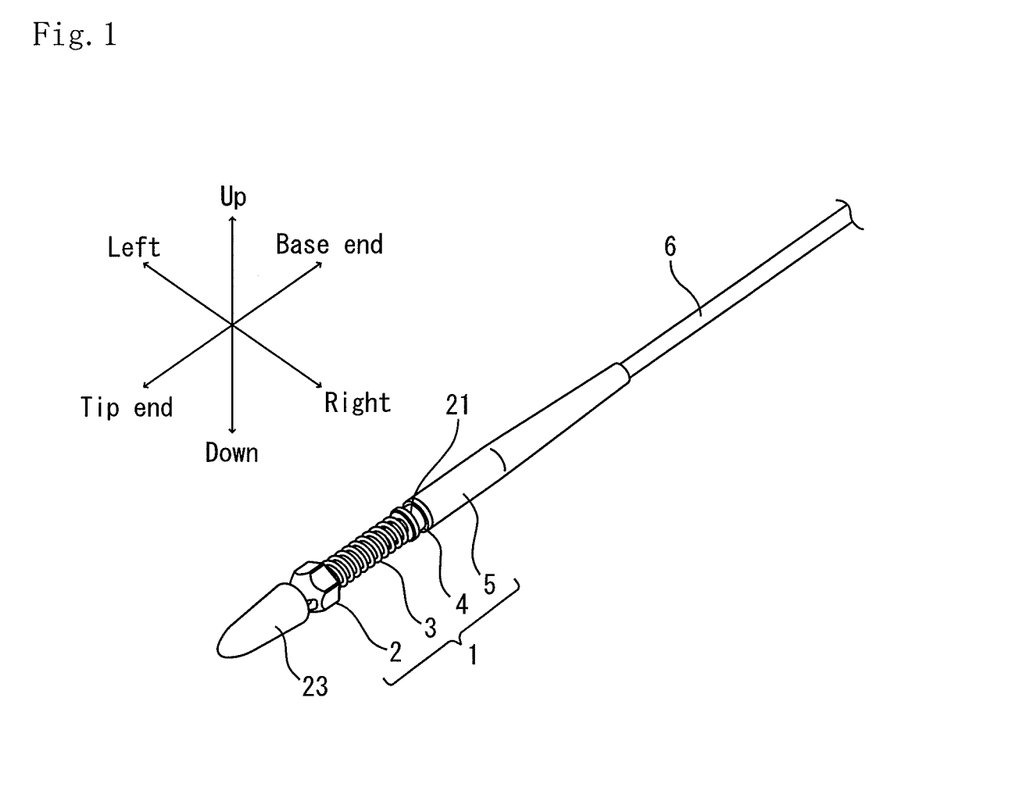
FIG. 1 is a perspective view illustrating an embodiment of an optical fiber connector component according to the present invention.
Figure 2:
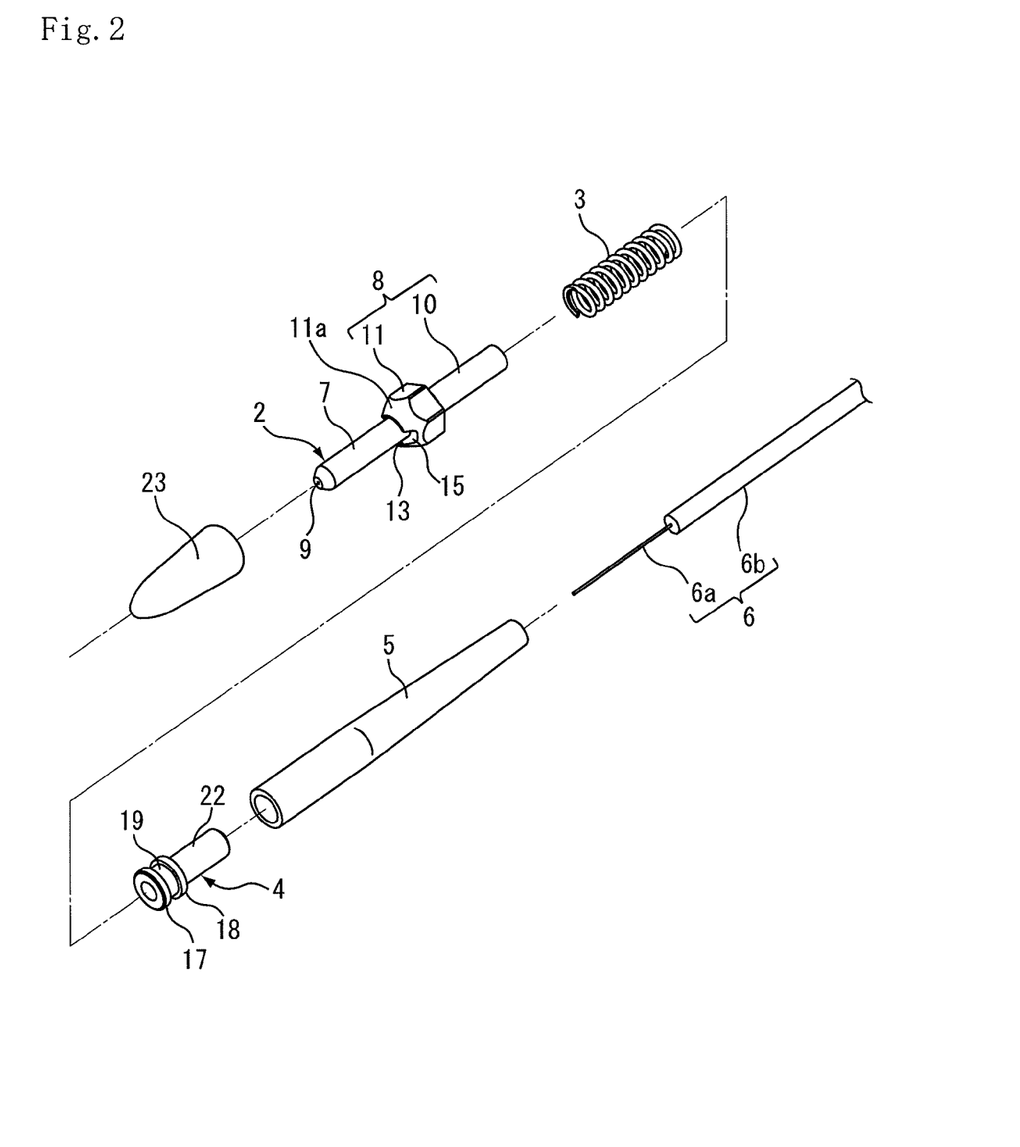
FIG. 2 is an exploded perspective view of the optical fiber connector component illustrated in FIG. 1.

As illustrated in FIGS. 1 and 2, an optical fiber connector component 1 according to an embodiment of a first invention is a component constituting an optical fiber connector 31 of a second invention together with a cover member 32 and a housing 33 described later. The optical fiber connector component 1 includes a ferrule 2, a coil spring 3 as a biasing means, a stop ring 4, and a boot 5. The ferrule 2, the coil spring 3, the stop ring 4, and the boot 5 have axial centers aligned and are arranged to enable an optical fiber 6 to be inserted thereinto sequentially from respective base end sides. The optical fiber 6 includes an optical fiber core wire 6a and a covering material 6b made of a resin material or the like around the optical fiber core wire 6a. It is to be noted that, although the optical fiber 6 in FIG. 2 is illustrated in a state where the optical fiber core wire 6a is exposed from the covering material 6b for convenience of description, the optical fiber 6 is normally inserted in the coil spring 3, the stop ring 4, and the boot 5 in a state where the optical fiber core wire 6a is covered with the covering material 6b. Also, as the optical fiber 6 for use in the present embodiment, one conventionally known can be used arbitrarily.

The ferrule 2 is adapted to let the optical fiber 6 inserted from the base end side and hold the optical fiber 6. As illustrated in FIG. 2, the ferrule 2 includes a ferrule main body 7 and a ferrule holding member 8. The ferrule main body 7 is a member whose tip end is formed in a tapered shape and is made of various ceramic materials such as zirconia. The ferrule main body 7 has a fiber hole 9 enabling the optical fiber core wire 6a to be inserted thereinto. The fiber hole 9 is a hole to let the optical fiber core wire 6a inserted and hold the optical fiber core wire 6a and is formed to have a diameter and a length enabling the optical fiber core wire 6a inserted therein to be fixed by adhesive. As described above, as illustrated in FIG. 5, a base end side of this fiber hole 9 is provided with a tapered or funnel-shaped opening that extends a hole diameter thereof toward an end portion and is formed to facilitate insertion of the optical fiber core wire 6a into the fiber hole 9.

The ferrule holding member 8 is adapted to hold the ferrule main body 7 and is made of a metal material such as stainless steel. The ferrule holding member 8 includes a holding portion 10 letting the optical fiber 6 inserted and holding the optical fiber 6 and a flange portion 11 formed to have a larger diameter than the holding portion 10. The ferrule holding member 8 is also provided with an optical fiber inserting hole 12 having an inner diameter enabling the optical fiber 6 to be inserted thereinto and a ferrule main body inserting hole 13 having an inner diameter enabling the ferrule main body 7 to be inserted thereinto. These optical fiber inserting hole 12 and ferrule main body inserting hole 13 are communicated into each other in the flange portion 11 and are formed so that central axes thereof may be located coaxially with each other. These optical fiber inserting hole 12 and ferrule main body inserting hole 13 are also formed to be coaxial with the fiber hole 9.

Figure 5:
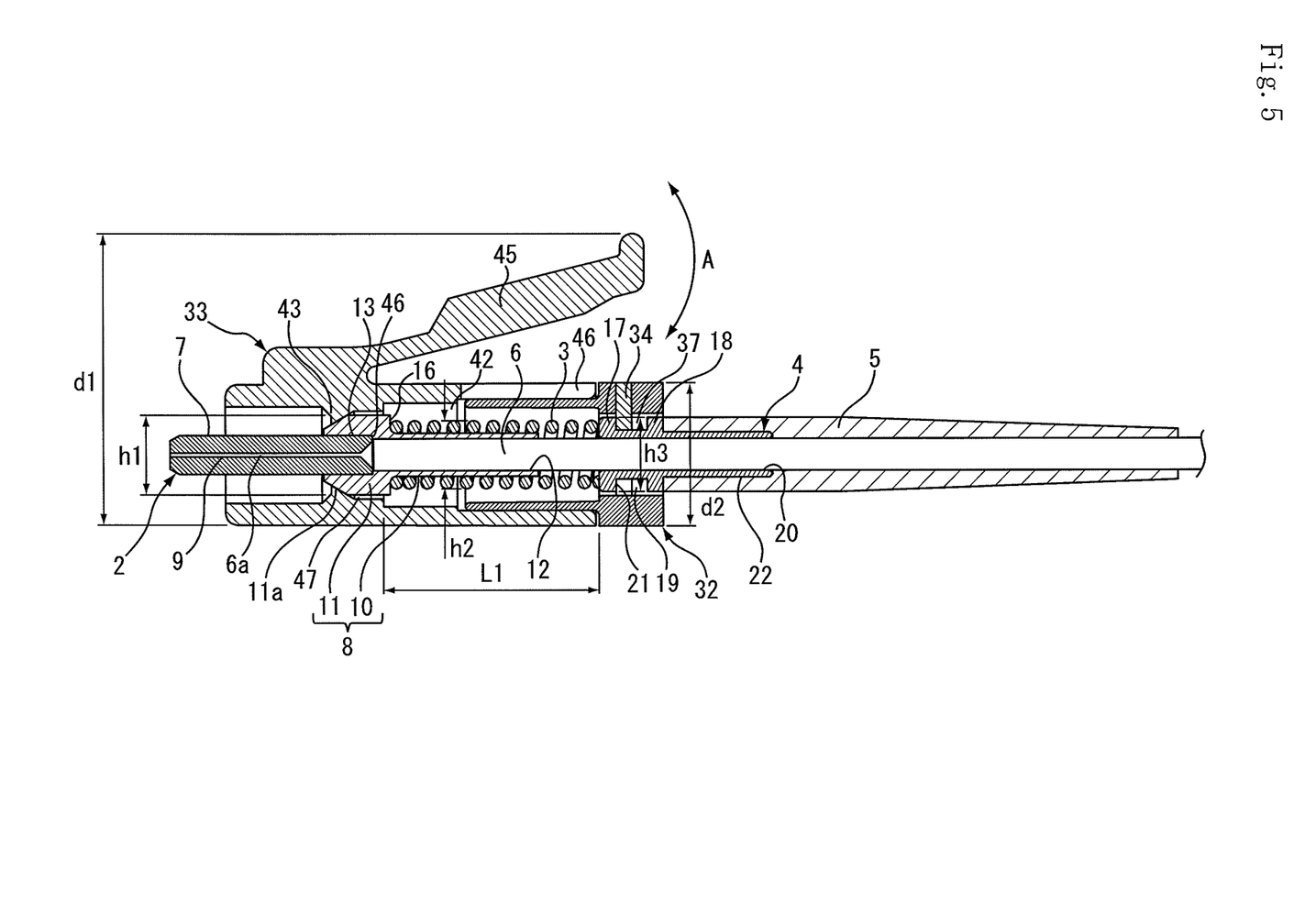
FIG. 5 is a vertical cross-sectional view of the optical fiber connector illustrated in FIG. 3 removing the cap.

As illustrated in FIG. 5, the optical fiber inserting hole 12 has the inner diameter formed to be smaller than the inner diameter of the ferrule main body inserting hole 13 and is opened to correspond to the funnel-shaped opening on the base end side of the ferrule main body 7 to be inserted into the ferrule main body inserting hole 13. Also, the inner diameter of the optical fiber inserting hole 12 is formed to be approximately equal to a diameter of the funnel-shaped opening formed on the base end side of the ferrule main body 7 so that the optical fiber core wire 6a to be inserted into an inside of the optical fiber inserting hole 12 may be inserted into an inside of the fiber hole 9 from the funnel-shaped opening smoothly.

The holding portion 10 is formed in a cylindrical shape so as to extend in a front-back direction and is provided therein with the optical fiber inserting hole 12. Meanwhile, the holding portion 10 has only to enable the optical fiber 6 to be inserted into the optical fiber inserting hole 12 to be fixed by adhesive reliably, and a length thereof is not particularly limited.

The flange portion 11 is formed on a tip end side of the holding portion 10 in the ferrule holding member 8 and is formed to have a larger diameter than an outer diameter of the holding portion 10. As is apparent from FIG. 2, the flange portion 11 is formed so that a shape seen from a front surface may be hexagonal. The reason for forming the flange portion 11 in a hexagonal shape is to enable positioning of the ferrule 2 and adjustment of an axial center of the optical fiber core wire 6a when the housing 33 of the optical fiber connector 31 described later is attached. Thus, the housing 33 is also provided with a hexagonal hole portion enabling the flange portion 11 to be fitted therein.

The flange portion 11 is also provided on a tip end side with a tapered portion 11a, and the tapered portion 11a is formed to enable to abut on a taper receiving portion 43 formed in a second through hole 42 of the after-mentioned housing 33. Also, the tapered portion 11a is provided with a cut-out 15. This cut-out 15 is to let a jig for use in adjustment of the axial center of the optical fiber core wire 6a attached thereto. The flange portion 11 is also provided with a shoulder portion 46 at an inner circumference of an end portion on a base end side of the large-diameter ferrule main body inserting hole 13 at which the small-diameter optical fiber inserting hole 12 formed in an inside of the flange portion 11 is opened, and an end portion on a base end side of the ferrule main body 7 is inserted in the ferrule main body inserting hole 13 of the flange 8, abuts on this shoulder portion 46, and is held.

As illustrated in FIG. 5, a portion communicating from the flange portion 11 into the holding portion 10 is provided with a step portion 16. This step portion 16 is formed to abut on a tip end of the coil spring 3. Also, a portion communicating from the step portion 16 into the holding portion 10 is provided with an r portion having an equal radius to a radius of a metal wire constituting the coil spring 3.

It is to be noted that the ferrule holding member 8 may be made of a material other than the metal material in a case that it can support the ferrule main body 7 and can attach and fix the inserted optical fiber 6.

The coil spring 3 is disposed to be located between the ferrule 2 or the step portion 16 of the flange portion 11 of the ferrule holding member 8 and the stop ring 4. The coil spring 3 is formed to have a size enabling the holding portion 10 of the ferrule holding member 8 and the optical fiber 6 inserted in the optical fiber inserting hole 12 of the holding portion 10 to be inserted thereinto. As this coil spring 3, one conventionally known can be used, and a material thereof is not particularly limited.

The stop ring 4 is a member disposed on the base end sides of the ferrule 2 and the coil spring 3 and is made of various metal materials such as stainless steel. The stop ring 4 is provided on a tip end side with a flange 17 and further on a base end side than the flange 17 with a receiving portion 18. Between these flange 17 and receiving portion 18 is formed a recess portion 19 formed so that an outer diameter thereof may be smaller than outer diameters of the flange 17 and the receiving portion 18. Also, as illustrated in FIG. 5, the stop ring 4 is provided with a fiber inserting hole 20 formed to have a size enabling the optical fiber 6 to be inserted thereinto so as to penetrate the stop ring 4.

The flange 17 is a portion functioning as a wind receiving portion of the present invention and is protruded and formed in a flange shape outward from the fiber inserting hole 20. A rear end side of the flange 17 is provided with a wind receiving portion 21. The wind receiving portion 21 is a surface receiving force by flow of gas to be supplied in a pipe in an equal direction to a direction of inserting the optical fiber 6 in a case where the optical fiber 6 is inserted into the pipe.

The receiving portion 18 is a receiving portion to define an inserting position of the boot 5 and is protruded and formed in a flange shape on a rear side or on a base end side of the flange 17 outward from the fiber inserting hole 20 or to an outside in a radial direction of the fiber inserting hole 20. The receiving portion 18 is arranged to be spaced from the flange 17 in a front-back direction via the recess portion 19 and to be located successively. Although an outer diameter of the receiving portion 18 may be equal to an outer diameter of the flange 17 or different from it in a range of a diameter equal to or smaller than an outer diameter of the flange portion 11, the outer diameter of the receiving portion 18 is preferably equal to or smaller than the outer diameter of the flange 17 to prevent the optical fiber component 1 from getting stuck in a pipe when the optical fiber 6 is inserted into the pipe.

Also, although the outer diameter of the receiving portion 18 is formed to be equal to an outer diameter of the attached boot 5 in the present embodiment, the outer diameter of the receiving portion 18 may be different from the outer diameter of the boot 5. Also, from a viewpoint of further preventing the optical fiber component 1 from getting stuck in the pipe when the optical fiber 6 is inserted into the pipe, the outer diameter of the receiving portion 18 is preferably equal to or smaller than the outer diameter of the flange portion 11 and equal to or larger than the outer diameter of the boot 5.

The stop ring 4 is provided on a base end side of the receiving portion 18 with a boot attaching portion 22 extending therefrom. The boot attaching portion 22 is adapted to attach the boot 5 located on a base end side of the stop ring 4 and is configured so that an outer circumferential surface of the boot attaching portion 22 may be covered with the boot 5. Also, the outer diameter of the boot attaching portion 22 is formed to be larger than an inner diameter of the boot 5 and is formed to prevent the boot 5 attached to the boot attaching portion 22 by press-fitting from coming off. Meanwhile, from a viewpoint of preventing the boot 5 from coming off, for example, the outer circumferential surface of the boot attaching portion 22 is preferably subjected to be worked as a mesh-like knurling form or the like.

As illustrated in FIG. 5, an outer diameter h1 of the flange portion 11 of the ferrule 2, an outer diameter h2 of the coil spring 3, and an outer diameter h3 of the flange 17 of the stop ring 4 are formed to be smaller than an outer dimension d1 of the housing 33 and an outer dimension d2 of the cover member 32 described later.

Meanwhile, the outer diameter h2 of the coil spring 3 and the outer diameter h3 of the flange 17 of the stop ring are preferably equal to or smaller than the outer diameter h1 of the flange portion 11 to lock both end portions of the coil spring. Setting sizes of the coil spring 3 and the stop ring 4 as above prevents the optical fiber connector component 1 from getting stuck in the pipe when the optical fiber 6 is inserted into the pipe or drastically decreases the possibility.

It is to be noted that the outer diameter h3 of the flange 17 may be larger than the outer diameter h2 of the coil spring 3 as long as it is equal to or smaller than the outer diameter h1 of the flange portion 11. Also, the outer diameter h3 of the flange 17 may be equal to or smaller than the outer diameter h2 of the coil spring 3 in a case that the end portions of the coil spring can be locked. Also, the outer diameter h3 of the flange 17 and the outer diameter of the receiving portion 18 may be equal to or different from each other. However, from a viewpoint of facilitating reception of force of gas to be supplied in an equal direction to a direction of inserting the optical fiber 6 when the optical fiber 6 is inserted into the pipe, the outer diameter h3 of the flange 17 is preferably larger than the outer diameter of the receiving portion 18.

The boot 5 is provided to prevent the optical fiber 6 extending from the base end side of the stop ring 4 from being bent excessively and disconnected and to prevent the stop ring 4 from being exposed and abutting and getting stuck in the pipe when the optical fiber 6 is inserted into the pipe. The boot 5 is a member made of a resin or the like and is formed to decrease an outer diameter thereof gradually toward a base end side.

As illustrated in FIG. 5, the boot 5 is provided with a hole having a slightly smaller diameter than the outer diameter of the boot attaching portion 22 of the stop ring 4 so as to penetrate the boot 5, and the hole is formed so that the boot 5 can be elastically deformed by pressure and attached when the boot 5 is attached to the boot attaching portion 22. Also, the outer diameter of the boot 5 on a tip end side is formed to be approximately equal to the outer diameter of the receiving portion 18 of the stop ring 4.

A cap 23 is a member made of a material such as a resin and is formed in a tapered shape in which an outer diameter is gradually thinned from a base end side to a tip end side. This cap 23 is removably attached to a tip end of the ferrule main body 7 and is used to be attached to the ferrule main body 7 when the optical fiber 6 is inserted into an inside of the pipe and to be detached when the optical fiber 6 is connected to another optical fiber 6.

(Configuration of Optical Fiber Connector 31)

Figure 3:
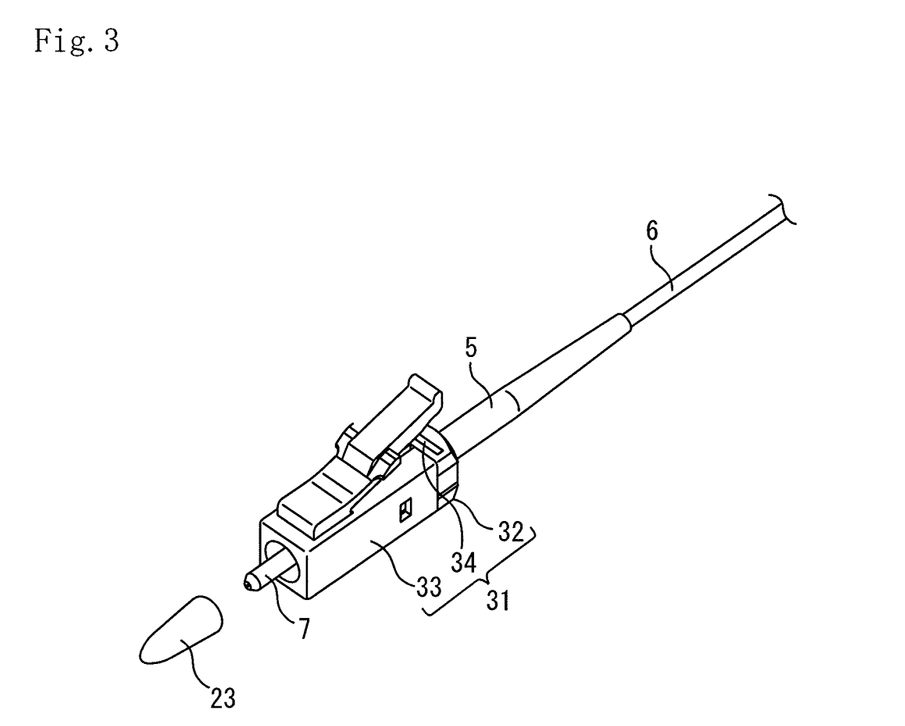
FIG. 3 is a perspective view illustrating an embodiment of an optical fiber connector according to the present invention.
Figure 4:
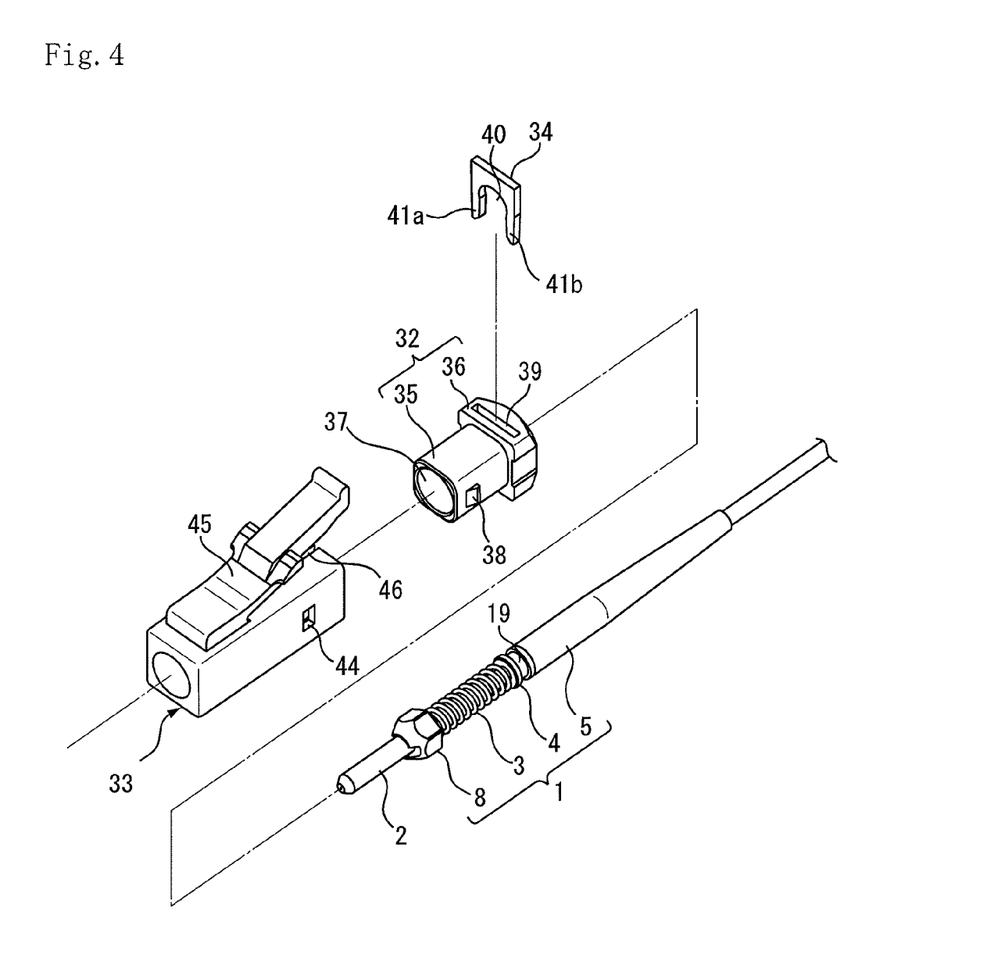
FIG. 4 is an exploded perspective view of the optical fiber connector illustrated in FIG. 3 removing a cap.

Next, a configuration of the optical fiber connector 31 according to the second invention will be described based on FIGS. 3 to 5. The optical fiber connector 31 is provided with the aforementioned optical fiber connector component 1. Meanwhile, since the configurations of the ferrule 2, the coil spring 3, the stop ring 4, and the boot 5 as the optical fiber connector component 1 have been described above, description thereof is omitted.

The optical fiber connector 31 includes the cover member 32, the housing 33, and a fixing member 34. The cover member 32 and the housing 33 have holes in a longitudinal direction so as to enable the optical fiber 6 attaching the optical fiber connector component 1 to be inserted thereinto from respective base end sides, and these cover member 32 and housing 33 are coupled and fixed together to form a coupled body. Also, the fixing member 34 is a member to couple and fix the cover member 32 with the stop ring 4.

The cover member 32 is a member enabling to be inserted into the housing 33 and coupled and fixed with the housing 33 and is made of various resin materials. The cover member 32 includes an inserting portion 35 to be inserted into an inside of the housing 33 and a fixing portion 36 formed at a wall portion at an end portion on a base end side of the inserting portion 35. The cover member 32 is also provided with a first through hole 37 having such a large diameter as to enable the flange portion 11 of the ferrule holding member 8 to be inserted thereinto and letting the stop ring to be inserted thereinto. The inserting portion 35 is formed to have a size enabling the inserting portion 35 to be inserted into an after-mentioned inserting hole of the housing 33 and is provided on right and left sidewalls with wedge-shaped projecting pieces 38 projecting in right and left directions. The fixing portion 36 adapted to fix the stop ring is provided with a fixing member inserting hole 39 formed to penetrate the fixing portion 36 in an up-down direction. The fixing member inserting hole 39 is formed to align axes so as to penetrate a wall portion at an end portion on a base end side of the cover member 32 and the first through hole 37 in a vertical direction and is formed to have a size enabling the fixing member 34 to be inserted into the fixing member inserting hole 39. It is to be noted that, although the fixing member inserting hole 39 is formed in a rectangular shape corresponding to a shape of the fixing member 34 in the present embodiment, the shape may be changed arbitrarily as long as the fixing member inserting hole 39 enables the fixing member 34 fixing the cover member to be inserted thereinto. Meanwhile, in an inside of the coupled body formed by coupling the housing 33 with the cover member 32 are arranged the stop ring 4, the coil spring 3, and the ferrule holding member 8 including the flange portion 11 and the holding portion 10.

The fixing member 34 is a plate-like member made of a metal such as stainless steel and has a plate thickness and a plate width enabling the fixing member 34 to be fitted in the fixing member inserting hole 39 formed in the cover member 32. The fixing member 34 is provided with a cut-out portion 40 cut from a lower side toward an upper side and is provided on right and left sides of the cut-out portion 40 with a pair of leg portions 41a and 41b. The pair of leg portions 41a and 41b is disposed to be located on an outer circumferential side of the recess portion 19 formed in the stop ring 4 and so that front surfaces of the leg portions 41a and 41b may abut on a rear surface of the flange 17 when the fixing member 34 is fitted in the fixing member inserting hole 39.

The housing 33 is a member located to cover a tip end side portion of the coil spring 3, a front end portion of the ferrule holding member 8, and a circumference of the ferrule 2 of the optical fiber connector component 1 and is made of various resin materials. The material for the housing 33 may be equal to or different from that for the cover member 32.

The housing 33 is formed in a rectangular solid shape and is provided between a tip end and a base end with the second through hole 42 to penetrate the housing 33. As illustrated in FIG. 5, at a middle portion of the second through hole 42 is formed the small-diameter taper receiving portion 43. The taper receiving portion 43 is formed in a tapered shape in which an inner diameter is decreased from a base end to a tip end and is formed to enable to abut on and be engaged with the tapered portion 11a formed in the flange portion 11 of the ferrule holding member 8. Also, between both end portions on a tip end side and on a base end side of the taper receiving portion 43 is formed a ferrule holding member inserting hole 47 having a larger diameter than the taper receiving portion 43 and the flange portion 11, and this ferrule holding member inserting hole 47 and both sides of the second through hole 42 are communicated with one another and are formed to align axes and penetrate the housing 33 from a base end to a tip end of the second through hole 42. As for the ferrule holding member 8, a position on a tip end side is determined by abutment between the tapered portion 11a of the flange portion 11 and the taper receiving portion 43.

Also, the housing 33 is provided on side surfaces in a right-left direction with engaging holes 44 at portions corresponding to positions of the cover member 32 at which the projecting pieces 38 are located when the cover member 32 is attached. Although these engaging holes 44 are formed to have sizes enabling the engaging holes 44 to be engaged with the projecting pieces 38 and are formed to be penetrated to outer circumferential sides of the side surfaces, these engaging holes 44 have only to be engaged with the projecting pieces 38 and do not have to be penetrated.

The housing 33 is provided on an upper surface with a latch 45. The latch 45 is used to attach and detach a not-illustrated connector cover and is formed to enable elastic deformation in an A direction illustrated in FIG. 5. Also, on the upper surface of the housing 33 is formed a fitting groove 48 from an end surface on a base end side toward a tip end side. The fitting groove 48 is adapted to facilitate elastic deformation of the housing 33 when the cover member 32 is inserted from a base end side of the housing 33 and is formed up to a position at which a tip end of the cover member 32 inserted in the housing 33 is located.

(Method for Attaching Optical Fiber Connector Component 1 and Method for Inserting Optical Fiber 6 into Pipe 100)

Next, a method for attaching the optical fiber connector component 1 to the optical fiber 6 will be described based on FIGS. 6(a) to 6(h). First, the boot 5 is inserted into the optical fiber 6 (FIG. 6(a)). As for the boot 5, a tip end of the optical fiber 6 is inserted into a base end side of the hole formed in the boot 5 up to a position at which the optical fiber 6 is pulled out of a tip end side of the boot 5. Subsequently, the stop ring 4 is inserted into the optical fiber 6 (FIG. 6(b)). As for the stop ring 4, the tip end of the optical fiber 6 is inserted into a base end side of the fiber inserting hole 20 up to a position at which the optical fiber 6 is pulled out of a tip end side of the stop ring 4. The boot attaching portion 22 of the stop ring 4 is pressed into the hole of the boot 5. The stop ring 4 is pressed up to a position at which a rear end surface of the receiving portion 18 abuts on a tip end surface of the boot 5. Subsequently, the coil spring 3 is inserted into the optical fiber 6 (FIG. 6(c)). As for the coil spring 3, the tip end of the optical fiber 6 is inserted into a base end side of the coil spring 3 up to a position at which the optical fiber 6 is pulled out of a tip end side of the coil spring 3. Subsequently, the covering material 6b at a tip end portion of the optical fiber 6 is removed to expose the optical fiber core wire 6a (FIG. 6(d)). The optical fiber 6 is inserted into the ferrule 2 (FIG. 6(e)). In the fiber hole 9 and the optical fiber inserting hole 12 of the ferrule 2, adhesive is injected in advance. A tip end of the optical fiber core wire 6a is inserted into a base end side of the holding portion 10 of the ferrule 2 until the tip end of the optical fiber core wire 6a is approximately coplanar with a tip end of the ferrule main body 7. In this manner, the optical fiber connector component 1 of the present invention is attached to the optical fiber 6.

Figure 6:
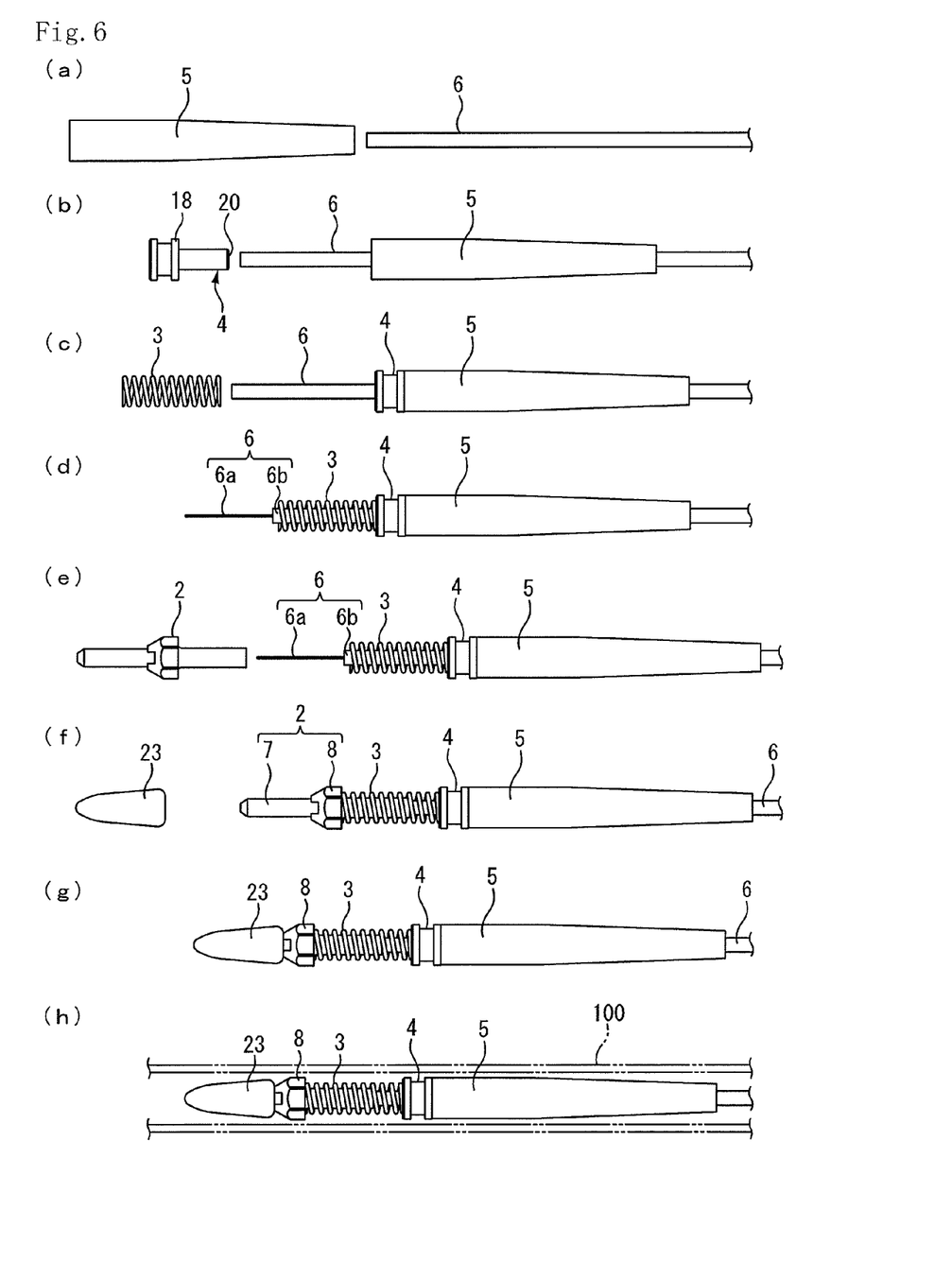
Figure 7:
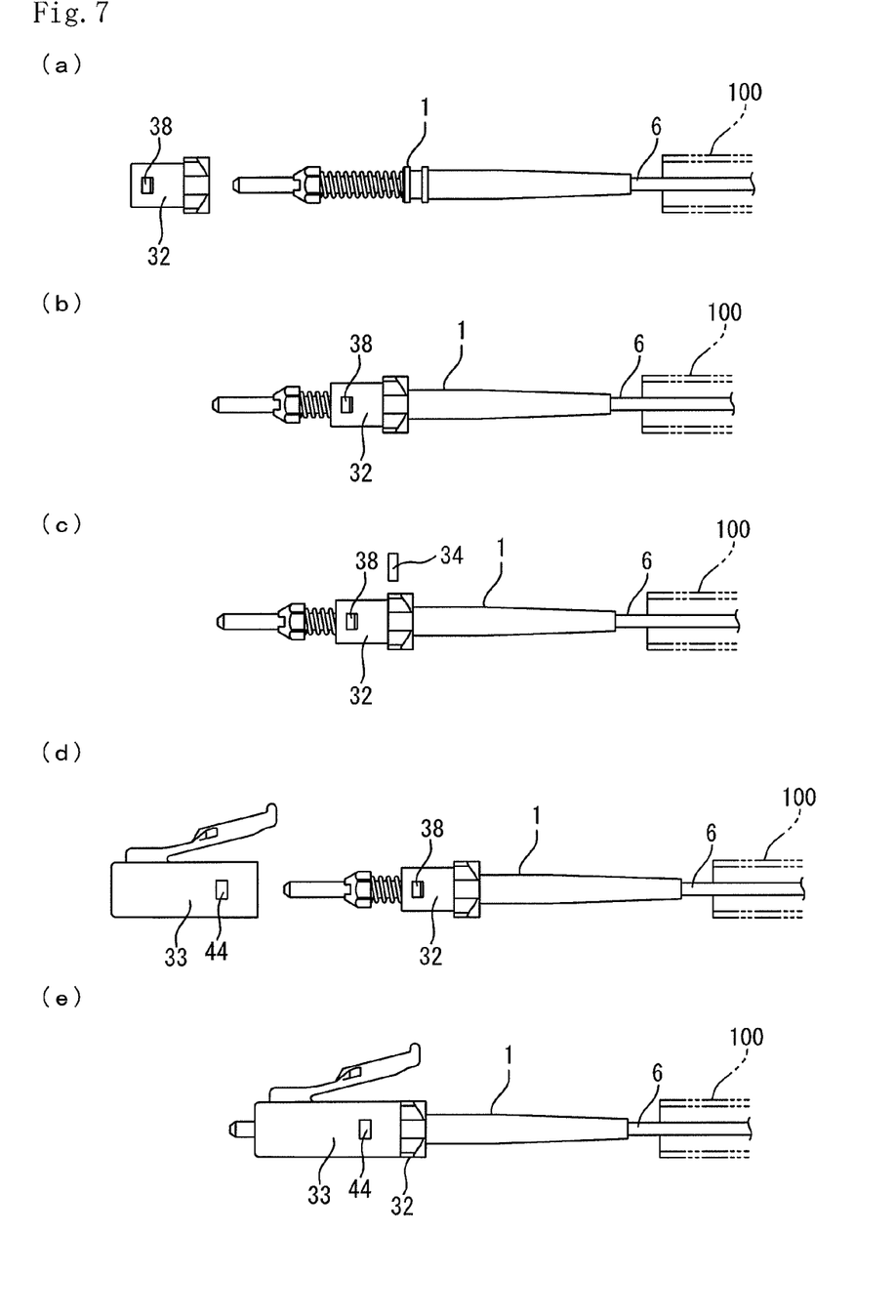

Next, a method for inserting the optical fiber 6 attaching the optical fiber connector component 1 into a pipe 100 will be described. In a case where the optical fiber 6 is inserted into the pipe 100, the cap 23 is first attached to the tip end of the ferrule main body 7 before insertion (FIG. 6(f) and FIG. 6(g)). Attaching the cap 23 to the tip end of the ferrule main body 7 can protect the ferrule main body 7 and the tip end of the optical fiber core wire 6a and prevent the ferrule main body 7 from getting stuck in an inner surface of the pipe 100 when the optical fiber 6 is inserted into the pipe 100. Subsequently, the optical fiber 6 attaching the optical fiber connector component 1 is inserted into the pipe 100 (FIG. 6(h)). As illustrated in FIG. 6(h), in the present embodiment, the optical fiber 6 is inserted into the pipe 100 in a state where the optical fiber connector component 1 is attached to the optical fiber 6. As illustrated in FIG. 5, the relationship between the diameter h1 of the flange portion 11, which is the largest diameter in the optical fiber connector component 1, and the width d1 of the housing is h1<d1. Thus, with the present invention, even when an inner diameter of the pipe 100 into which the optical fiber 6 is inserted is drastically thinned, the optical fiber 6 can be inserted into the pipe 100 more easily than in a conventional case in which the optical fiber is inserted into the pipe after the fiber connector component is equipped with the cover member and the housing. Also, in a case where a large-diameter pipe similar to a conventional one is used, more optical fibers 6 can be inserted at a time. Also, the pipe 100 can be thinned in a case where plural optical fibers 6 are inserted.

Meanwhile, when the optical fiber 6 is inserted into the pipe 100, it is preferable to supply gas such as compressed air in the pipe 100 in an equal direction to a direction of inserting the optical fiber 6. By supplying gas in the pipe 100, the gas hits against the wind receiving portion 21 of the flange 17, and force of flowing gas such as compressed air acts on the optical fiber 6 in a direction in which the optical fiber 6 is pressed. Thus, the optical fiber 6 is inserted into the pipe 100 more smoothly.

(Method for Assembling Optical Fiber Connector 31)

Next, a method for assembling the optical giver connector after the optical fiber is inserted into the pipe will be described based on FIGS. 7(a) to 7(e). First, the cover member 32 is attached to the optical fiber connector component 1 (FIG. 7(a)). A tip end of the ferrule main body 7 is inserted into a base end side of the first through hole 37 of the cover member 32 and is moved up to a position at which a position of the fixing member inserting hole 39 corresponds to a position of the recess portion 19 formed in the stop ring 4 (FIG. 7(b)). Subsequently, the housing 33 is attached to the optical fiber connector component 1 (FIG. 7(d)). The tip end of the ferrule main body 7 is inserted into a base end side of the second through hole 42 of the housing 33. As for the housing 33, the inserting portion 35 formed in the cover member 32 is inserted into the base end side of the second through hole 42. The inserting portion 35 is inserted until the projecting pieces 38 are engaged with the engaging holes 44, and by engaging the projecting pieces 38 with the engaging holes 44, the optical fiber connector 31 of the present embodiment is assembled (FIG. 7(e)).

At this time, as illustrated in FIG. 5, space is formed in an inside of the coupled body of the housing 33 and the cover member 32. A length L1 of this space in a longitudinal direction is formed to be shorter than a natural length of the coil spring 3 or a length of the coil spring before compression.

Thus, in the inside of the coupled body of the housing 33 and the cover member 32, the coil spring 3 is compressed in an axial direction to get shorter than the natural length and applies force to the stop ring 4 fixed by the fixing member in a direction to cause the stop ring 4 to press the ferrule 2 toward a tip end side all the time, and the ferrule 2 attached to the ferrule holding member keeps a state of being biased to the tip end side all the time. Meanwhile, at this time, the flange portion 11 of the ferrule holding member 8 is fitted in the hexagonal hole formed in the housing 33. In a case where the optical fiber 6 is turned, the ferrule holding member 8 is pressed backward against spring force of the coil spring 3 with use of a dedicated jig to release fitting between the flange portion 11 and the hexagonal hole and is thereafter turned in a predetermined direction. After the turning, the flange portion 11 and the hexagonal hole are fitted again. Such turning enables a position of the core of the optical fiber 6 to be adjusted and changed before and after the turning.

In this manner, since the optical fiber connector component 1 of the present embodiment can be inserted into the pipe in a state of attaching the ferrule 2, the stop ring 4, and the boot 5 to the optical fiber 6, the optical fiber 6 can be inserted reliably even with use of a thin pipe. Also, even in a case where the plurality of optical fibers 6 are inserted into one pipe, a thin pipe can be used. Further, a gap having a predetermined dimension is formed between an inner circumferential surface of the pipe and outer circumferential surfaces of the flange 17 and the receiving portion 18 of the stop ring 4. Since the optical fiber connector component 1 of the present embodiment is provided at the flange 17 of the stop ring 4 with the wind receiving portion 21, the wind receiving portion 21 receives pressing force by gas flowing in the gap at the time of supplying the gas in an equal direction to a direction of inserting the optical fiber 6, which enables propulsive force to be increased, when the optical fiber 6 is inserted into the pipe. Accordingly, the optical fiber connector component 1 of the present embodiment is easy to be inserted into the pipe smoothly and can prevent getting stuck of the optical fiber connector component 1 in the pipe or disconnection of the optical fiber 6 or breakage of the optical fiber connector component 1 caused by the stuck state.

Also, in the optical fiber connector 31 of the present embodiment, since the cover member 32 and the housing 33 are attached after the optical fiber connector component 1 is inserted into the pipe, possibility of breakage of the cover member 32 and the housing 33 in the pipe can be eliminated, and reliability in connection of the optical fiber connector 31 to another part can be improved.

EXAMPLES

Example 1

Attachment of Optical Fiber Connector Component:

In the present example, the optical fiber having a diameter of 0.9 mm and a length of 200 m was prepared. Subsequently, the boot 5, the stop ring 4, and the coil spring 3 were inserted into a tip end of the optical fiber 6, and after insertion, the cover at a tip end portion of the optical fiber 6 was removed to expose the fiber core wire 6a. The tip end portion of the optical fiber 6 was inserted and held into the ferrule 2, and the cap 23 was attached to a tip end of the ferrule main body 7. Meanwhile, in Example 1, one provided at a tip end with the flange was used as the stop ring 4, and one not subjected to a special process on a surface of the covering material was used as the optical fiber 6.

(Carriage Test)

Subsequently, a feeder adapted to send the optical fiber 6 was prepared, and the optical fiber 6 attaching the optical fiber connector component 1 at a tip end was set in the feeder. Subsequently, a pipe having an inner diameter of 30 mm and a length of 100 m was prepared, the optical fiber 6 attaching the optical fiber connector component 1 was arranged in a state of enabling to be inserted into the pipe from a rear end of the pipe, and insertion of the optical fiber 6 into the pipe was started while air having pressure of 0.8 MPa was being supplied in the pipe. The feeder is provided with a counter indicating a feeding length of the optical fiber 6, and since a counting value in the counter changes when the optical fiber 6 is fed, whether or not the counter value changed was visually checked in a carriage test to determine whether or not the optical fiber 6 was inserted into the pipe. In the carriage test, in a case where the aforementioned counter was operated continuously, and where the optical fiber 6 was pulled out of a front end side of the pipe, the state was evaluated as a circle. Also, in a case where the aforementioned counter ceased operation before the optical fiber 6 was pulled out of the front end side of the pipe, the case was regarded as occurrence of getting stuck of the optical fiber 6 in the middle of the pipe, and the case was evaluated as a cross. A result of the carriage test in Example 1 is shown in Table 1.

Example 2

In Example 2, the optical fiber connector component 1 was attached to the optical fiber 6 in a similar manner to Example 1 except for not using the boot 5. Subsequently, the carriage test was performed under similar conditions to those in Example 1. A result of the carriage test in Example 2 is shown in Table 1.

Comparative Example 1

In Comparative Example 1, the optical fiber 6 similar to that in Example 1 was prepared, and the carriage test was performed under similar conditions to those in Example 1. Meanwhile, for the optical fiber 6 used in Comparative Example 1, one without the boot 5, the stop ring 4, the coil spring 3, and the ferrule 2 was used. A result of the carriage test in Comparative Example 1 is shown in Table 1.

As is apparent from Table 1, in the present invention provided with the stop ring 4 having the wind receiving portion 21, receiving force along with flow of gas is larger, and this force largely contributes to insertion of the optical fiber 6 into the pipe.

TABLE 1

|  | Carriage Test |
|---|---|
| Example 1 | ○ |
| Example 2 | ○ |
| Comparative Example 1 | X |

Reference Signs List
1 optical fiber connector component
2 ferrule
3 coil spring
4 stop ring
5 boot
6 optical fiber
6a optical fiber core wire
7 ferrule main body
8 ferrule holding member
9 fiber hole
10 holding portion
11 flange portion
12 optical fiber inserting hole
13 ferrule main body inserting hole
17 flange
18 receiving portion
19 recess portion
20 fiber inserting hole
21 wind receiving portion
22 boot attaching portion
23 cap
31 optical fiber connector
32 cover member
33 housing
34 fixing member
35 inserting portion
36 fixing portion
39 fixing member inserting hole
46 shoulder portion
47 ferrule holding member inserting hole
100 pipe

The invention claimed is:

1. An optical fiber connector component comprising:
a ferrule having a ferrule main body, the ferrule main body being provided with a fiber hole at an axial center of the ferrule main body, the fiber hole being configured to hold an optical fiber inserted into the fiber hole;
a ferrule holding member that is provided coaxially with the ferrule main body, the ferrule holding member including:
a holding portion that is configured to hold the optical fiber inserted into the ferrule holding member; and
a flange portion that holds an end portion of the ferrule main body on a base end side of the ferrule main body, the flange portion being formed to have a larger diameter than the holding portion;
a stop ring disposed on the base end side of the ferrule main body, the stop ring including:
an optical fiber inserting hole that is configured to hold the optical fiber inserted in the optical fiber inserting hole;
a brim protruded and formed outward in a radial direction of the optical fiber inserting hole;
a wind receiving portion defined to receive flowing gas on a base end side of the brim; and
a boot attaching portion extended from the brim in a base end side direction, wherein a boot is pressingly fitted to the boot attaching portion; and
a biasing means disposed between the flange portion of the ferrule holding member and the stop ring, the biasing means being configured to press the ferrule, wherein
the biasing means and the stop ring have outer diameters equal to or smaller than the outer diameter of the flange portion, respectively, to enable smooth insertion of the optical fiber connector component through a pipe.

2. The optical fiber connector component according to claim 1, wherein the ferrule, the stop ring, and the biasing means are coaxially disposed such that their central axes are all aligned.

3. The optical fiber connector component according to claim 1, further comprising a cap formed in a tapered shape, wherein
an outer diameter of the cap is gradually thinned from a base end side of the cap toward a tip end side of the cap; and the cap is configured to be attached to a tip end of the ferrule.

4. The optical fiber connector component according to claim 1, wherein the boot includes a hole that is configured to hold the boot attaching portion of the stop ring, the boot attaching portion being inserted in the hole.

5. The optical fiber connector component according to claim 4, wherein
   the brim of the stop ring is provided with a boot receiving portion on the base side end of the stop ring, from which the boot attaching portion extends, the boot receiving portion configured to be in contact with the boot; and
   the end portion of the ferrule main body on the base end side is provided with a funnel-shaped recess guiding an end portion of an optical fiber core wire to the fiber hole of the ferrule main body.

6. An optical fiber connector comprising:
   a housing;
   a cover member coupled and fixed with the housing;
   an optical fiber connector component that is disposed and fixed in an assembled connecting body of the housing and the cover member, the optical fiber connector component comprising:
      a ferrule having a ferrule main body, the ferrule main body being provided with a fiber hole at an axial center of the ferrule main body, the fiber hole being configured to hold an optical fiber inserted into the fiber hole;
      a ferrule holding member that is provided coaxially with the ferrule main body, the ferrule holding member including:
         a holding portion that is configured to hold the optical fiber inserted into the ferrule holding member; and
         a flange portion that holds an end portion of the ferrule main body on a base end side of the ferrule main body, the flange portion being formed to have a larger diameter than the holding portion;
      a stop ring disposed on the base end side of the ferrule main body, the stop ring including:
         an optical fiber inserting hole that is configured to hold the optical fiber inserted in the optical fiber inserting hole;
         a recess portion;
         a brim protruded and formed outward in a radial direction of the optical fiber inserting hole;
         a wind receiving portion defined to receive flowing gas on a base end side of the brim; and
         a boot attaching portion extended from the brim in a base end side direction, wherein a boot is pressingly fitted to the boot attaching portion; and
      a biasing means disposed between the flange portion of the ferrule holding member and the stop ring, the biasing means being configured to press the ferrule, wherein
         the biasing means and the stop ring have outer diameters equal to or smaller than the outer diameter of the flange portion, respectively, to enable smooth insertion of the optical fiber connector component through a pipe; and
      a fixing member having a cut-out portion, the fixing member being provided with a pair of leg portions on both sides of the cut-out portion to fix the cover member with the stop ring of the optical fiber connector component; wherein
         the cover member is provided with a fixing member inserting hole,
         the pair of leg portions of the fixing member is inserted in the fixing member inserting hole of the cover member and is fitted in the recess portion of the stop ring, a front surface of the fixing member abutting a rear surface of the brim; and
         the cover member and the optical fiber connector component are coupled and fixed.

7. The optical fiber connector according to claim 6, wherein outer diameters of the ferrule, the biasing means, and the stop ring of the optical fiber connector component are formed to be smaller than inner diameters of the through hole of each of the housing and the cover member.

* * * * *